United States Patent
Okawa et al.

(10) Patent No.: US 7,755,696 B2
(45) Date of Patent: Jul. 13, 2010

(54) IMAGE PICKUP DEVICE AND FOCUSING NOTIFICATION METHOD

(75) Inventors: Akira Okawa, Yokohama (JP); Ryo Suzuki, Yokohama (JP); Noriyuki Uenishi, Kawasaki (JP)

(73) Assignee: Fujitsu Semiconductor Limited, Yokohama (JP)

(*) Notice: Subject to any disclaimer, the term of this patent is extended or adjusted under 35 U.S.C. 154(b) by 775 days.

(21) Appl. No.: 11/050,748

(22) Filed: Feb. 7, 2005

(65) Prior Publication Data
US 2006/0055814 A1    Mar. 16, 2006

(30) Foreign Application Priority Data
Sep. 16, 2004   (JP) .............................. 2004-269382

(51) Int. Cl.
*H04N 5/232*    (2006.01)
*G03B 13/00*    (2006.01)
(52) U.S. Cl. .................................. 348/345; 348/333.02
(58) Field of Classification Search ................ 348/345, 348/346, 333.02, 333.04
See application file for complete search history.

(56) References Cited

U.S. PATENT DOCUMENTS

| 4,999,665 | A | 3/1991 | Kuroda et al. | |
| 6,750,914 | B2* | 6/2004 | Sannoh et al. | 348/346 |
| 2005/0104992 | A1* | 5/2005 | Aoyama et al. | 348/345 |
| 2006/0044452 | A1* | 3/2006 | Hagino | 348/345 |
| 2006/0146174 | A1* | 7/2006 | Hagino | 348/349 |

FOREIGN PATENT DOCUMENTS

| JP | 1-288846 A | 11/1989 |
| JP | 5-323447 | 12/1993 |
| JP | 09-113810 A | 5/1997 |
| JP | 2000-92354 | 3/2000 |
| JP | 2002-277727 A | 9/2002 |
| JP | 2002-311328 A | 10/2002 |
| JP | 2003-262787 A | 9/2003 |

* cited by examiner

*Primary Examiner*—Gevell Selby
(74) *Attorney, Agent, or Firm*—Arent Fox LLP

(57) ABSTRACT

To inform the users of the time necessary for focus to be achieved by changing the focal mark shown on the display monitor, second by second, corresponding to the elapsed time from the start of the auto focus operation until focus is achieved. The users are informed of the status of the auto focusing operations, and have a good idea of how much longer it will take for focusing to be completed. As a result, it increases the probability of users holding the camera still, so as to produce precisely focused photographs.

3 Claims, 6 Drawing Sheets

FOCAL MARK 30

FOCAL MARK 30

FIG. 5B  FOCAL MARK 30

FIG. 5E  FOCAL MARK 30

FOCAL MARK 30

FOCAL MARK 30

IMAGE PICKUP DEVICE AND FOCUSING NOTIFICATION METHOD

CROSS-REFERENCE TO RELATED APPLICATIONS

This application is based upon and claims priority of Japanese Patent Application No. 2004-269382, filed in Sep. 16, 2004, the contents being incorporated herein by reference.

BACKGROUND OF THE INVENTION

1. Field of the Invention

This invention relates to an image pickup device, such as digital cameras equipped with an auto focus function (including digital cameras built into cell phones), etc. and, in particular, relates to an image pickup device and focusing notification method to provide notification about elapsed time from the start of the auto focus operation until focus is achieved.

2. Description of the Related Art

On digital cameras which have been coming into wide use rapidly in recent years, the high resolution and functionality have been advancing, and the built-in auto focus function with which cameras automatically focus is becoming common.

FIG. 1 shows an example of existing focusing notification methods. In FIG. 1, on display unit 20, such as the finder of an image pickup device or the liquid crystal display (LCD), the monitor displays the focal state, in other words, focal mark 30 is displayed to show that the auto focus is in progress or the completion of focusing along with the subject. In the example of FIG. 1, focal mark 30 is displayed during auto focusing as a rectangular frame, and is displayed as a cross after focusing. In this way, by differentiating between auto focus in progress and completion of focusing, users are notified about the completion of focusing. This allows users to judge when to press the shutter button for image pickup.

FIGS. 2A and 2B show other examples of the existing focusing notification methods. In another example, focal mark 30 does not take different forms between auto focus in progress and focusing in progress, but there are differences in color (for example, from red to green) and users are notified that focusing has been completed. In FIGS. 2A and 2B, the forms of the focal mark and the display positions are different.

Also, on auto focus cameras, a scale is inserted around subjects to clarify the size of subjects, and image pickup devices are also known that insert a scale, with its index automatically adjusted, depending on the distance to the subjects, as measured by the auto focus operation.

Generally, it is desirable to immobilize a camera during the auto focus operation because this helps to measure the focal distance more accurately. On the other hand, a slight movement of the hands holding a camera prevents the accurate measurement of focal distance. The auto focus function needs to operate a lens, and also, when trying to enhance accuracy, more time is required. Users tend to be concerned about the time to achieve focus. During the time to achieve focus, it may happen that accurate focus is not obtained, due to movement of the hands.

Meanwhile, as prior art, during the time from the start of the auto focus operation until focus is achieved, if the mark showing the auto focusing is constantly displayed, users cannot judge how much time remains before focus is achieved. For this reason, during auto focusing, the probability of causing hand movement may be increased, and the problem is that focal distance cannot be measured accurately.

Under these circumstances, a means is needed for visually notifying users of the time for focus to be achieved.

SUMMARY OF THE INVENTION

Consequently, the objective of this invention is to offer an image pickup device and focusing notification method which can notify users of the time until focus is achieved by continuously changing the focal mark on the display monitor, second by second, during the time from the start of auto focus operation until focus is achieved, depending on the elapsed time.

The first structure of the image pickup device in this invention to achieve the abovementioned objective is characterized by comprising: a display for displaying pictures taken in from a lens; and a control unit for controlling to display a focal mark showing the focal condition on said display unit and changing the focal mark according to an elapsed time from the start of the auto focus operation until focus is achieved.

Also, the second structure of the image pickup device in this invention is characterized in that, in the above first structure, said control unit changes the form, color or display position of said focal mark.

Also, the third structure of the image pickup device in this invention is characterized in that, in the above first structure, an auto focus operation determines a focal location by driving the lens in sequence to multiple locations configured in advance, and wherein the control unit changes the focal mark according to driving of the lens to each location.

Also, the fourth structure of the image pickup device in this invention is characterized in that, in the above first structure, during the focal mark is being changed based on a first elapsed time that was planned, from the start of the auto focus operation until focus is achieved, when a remaining time of the first elapsed time until focus is achieved changes due to the progress of the auto focus operation, the control unit updates of changes in the focal mark according to changes in the remaining time.

Also, a method for providing notification about the focusing time in an auto focus operation in this invention is characterized by comprising the steps of: displaying a focal mark showing the focal state, when displaying images taken in from a lens; and changing the focal mark according to an elapsed time from the start of the auto focus operation until focus is achieved.

The image pickup device and focusing notification method in this invention allow users to show the progress of the auto focus operation by means of changing the focal mark, depending on the elapsed time from the start of the auto focus operation until focus is achieved.

In the event that the auto focus operation takes longer than users expect, it would likely cause the users to move their hands, which are holding the camera, during auto focusing, but as a result of this invention, users know the progress of the auto focus operation, and can judge how much more time will elapse before focus is achieved, so the probability of the movement of hands is decreased, and focus can be accurately achieved.

BRIEF DESCRIPTION OF THE DRAWINGS

FIGS. 5A-5F are figures to describe the changes in the focal mark in the form of execution of this invention.

DESCRIPTION OF THE PREFERRED EMBODIMENTS

The form of execution of this invention will now be explained, referring to the figures. However, these examples of the forms of execution do not limit the technical scope of this invention.

Figure 1:
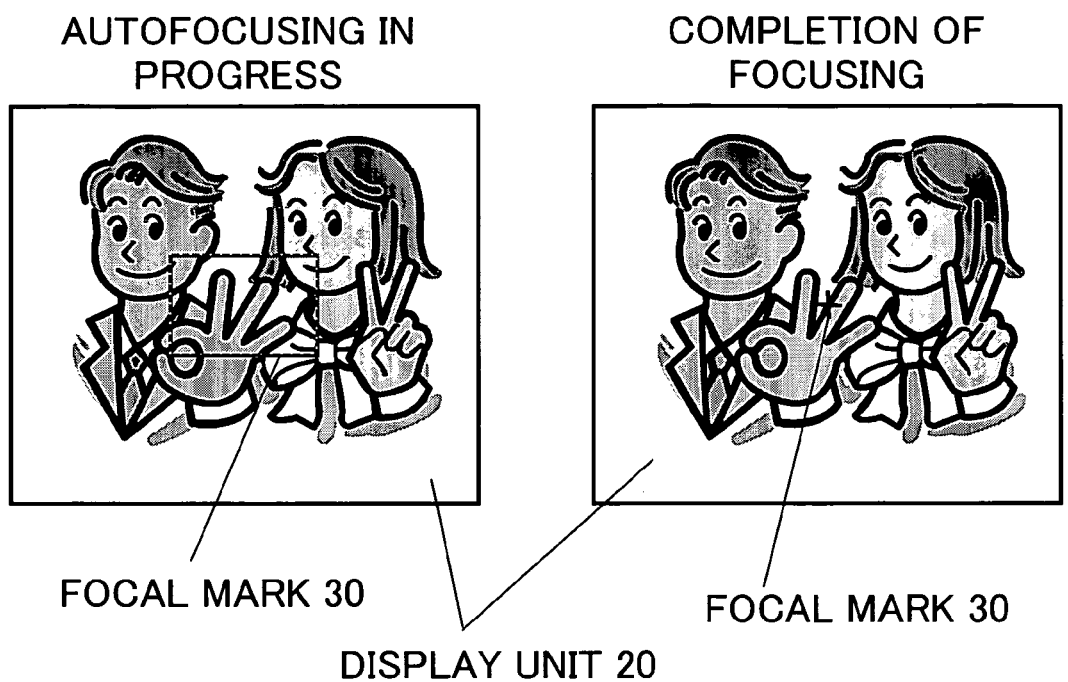
FIG. 1 is a figure of a conventional focusing notification method.
Figure 2A:
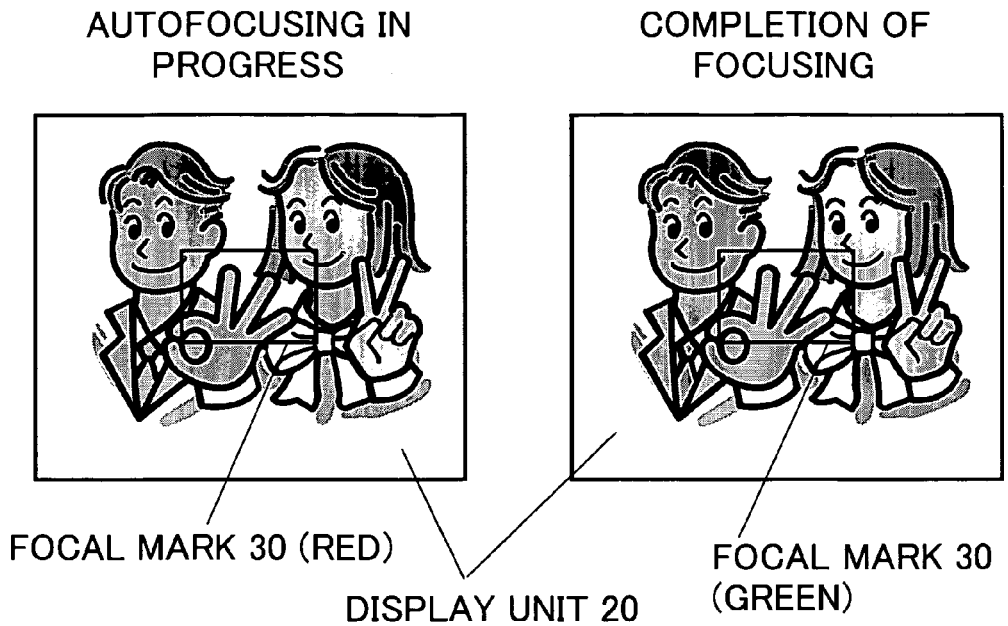
FIGS. 2A and 2B are figures of another conventional focusing notification method.
Figure 2B:
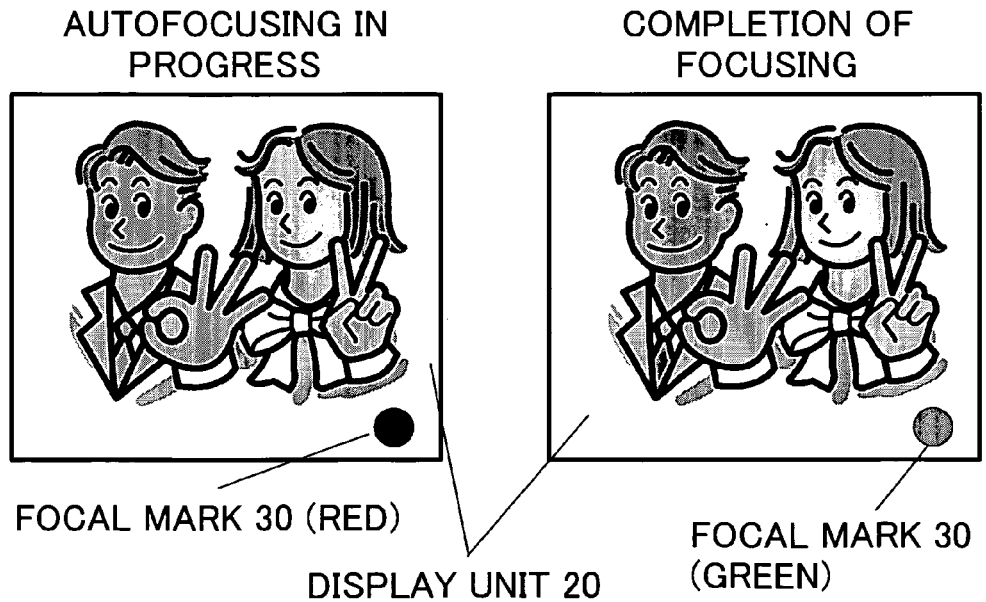
Figure 3:
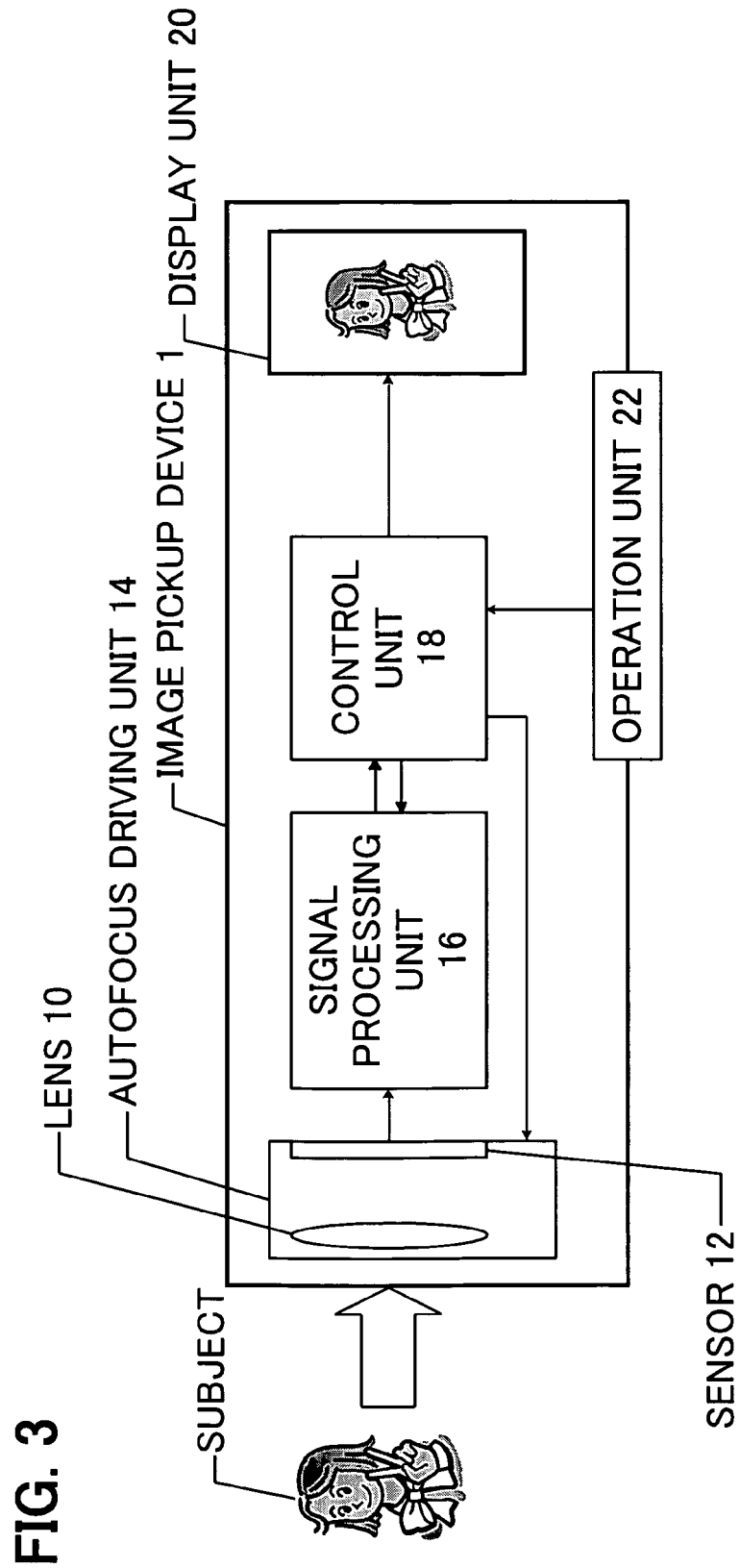
FIG. 3 is a figure of an example of the block structure of an image pickup device in the form of execution of this invention.

FIG. 3 shows examples of the block structure of an image pickup device in the form of execution of this invention. In image pickup device 1, lens 10 takes the light of the subject into the image pickup device 1, collects all the light and then transmits it to sensor 12. Sensor 12, which consists, for example, of a CCD or C-MOS sensor, etc., takes the light collected at lens 10, and by sorting the colors (the three primary colors), sends out color signals to a later stage, the signal processing unit 16. An auto focus driving unit 14 drives lens 10 using a stepping motor, etc., changes the distance from sensor 12, and changes the distance from the subject in order for focus to be achieved (focusing). Signal processing unit 16 processes the production of data that is to be displayed, by transforming color signals sent by sensor 12 into a data format which can be displayed on display unit 20, and various other signal processing such as the processing of the results of detection arising from auto focus operations. Control unit 18 controls to display the display data acquired from signal processing unit 16, on display unit 20, and additionally controls signal processing unit 16 and auto focus driving unit 14 when operation unit 18 requests auto focus operations from operation unit 22. Display unit 20 displays the display data sent by control unit 18. Operation unit 22 includes a power switch and shutter, etc., for example, and by pressing the shutter halfway down, the requirement for auto focus is output, and also by pressing the shutter all the way down, the requirement for taking a picture is output.

In image pickup device 1 of the above structure, with the present example of the forms of execution, during the time from the start of the auto focus operation until focus is achieved, the focal mark displayed on display unit 20 is changed according to the elapsed time. In the form of execution of this invention, without regard to the type of auto focus, any type of auto focus function can be applied. An example is now described which adopts a focusing method in which, in cases where an image pickup device drives a lens with a stepping motor, graphic contrast is transformed in each of multiple sample steps placed in a pre-set specific step interval out of the total number of steps, and a lens is driven to the location of the sample step with the maximum peak.

Also, the image pickup device may have two modes, the normal mode and the macro mode, for picture taking. The normal mode is used when the focal distance ranges from infinitely far to about 30 cm, and macro mode is used when the focal distance is no more than 30 cm and no less than 5 cm. Due to the properties of the lens, the shorter the focal distance is, the shallower the depth of field becomes, and the narrower the width of the focus distance to be achieved becomes. Therefore, when using the macro mode, compared to the normal mode, the step interval is required to be smaller or the number of samples in the sample step needs to be increased. For example, there are 5 samples in the normal mode and 10 samples in the macro mode. Imaging mode can be optionally switched through the operation, by the user, of operation unit 22. Of course, an image pickup device without multiple imaging modes, can be a structure to move seamlessly from the nearest point to an infinite point, but in the example of the forms of execution below, a case with the 2 abovementioned imaging modes is explained.

Figure 4:
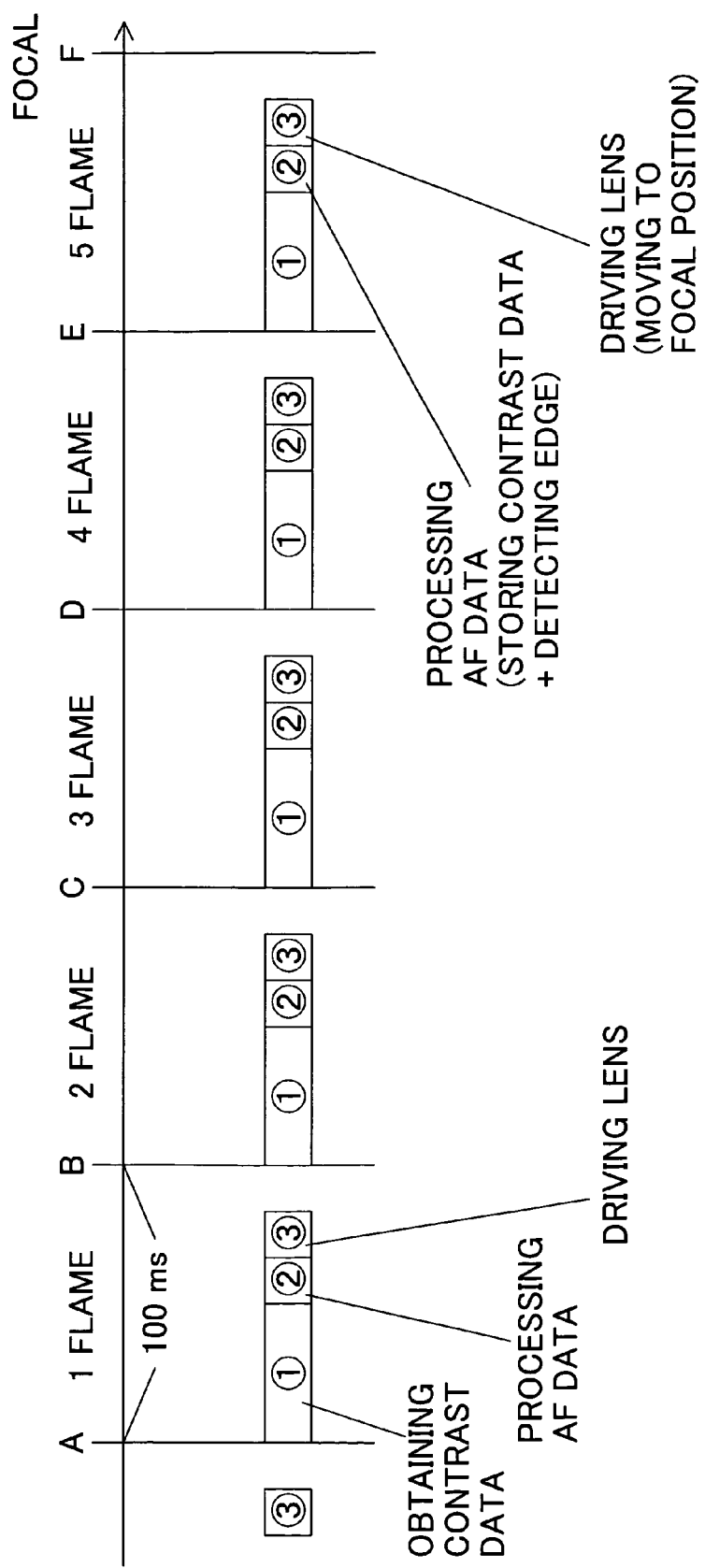
FIG. 4 is a figure to describe the auto focus operation in the normal mode.
Figure 5A:
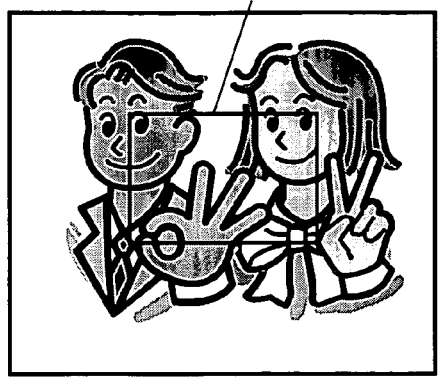
Figure 5D:
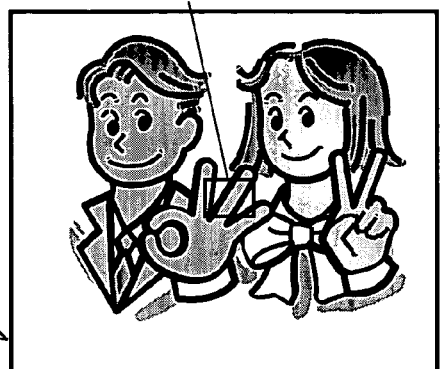
Figure 5D:
Figure 5D:
Figure 5D:
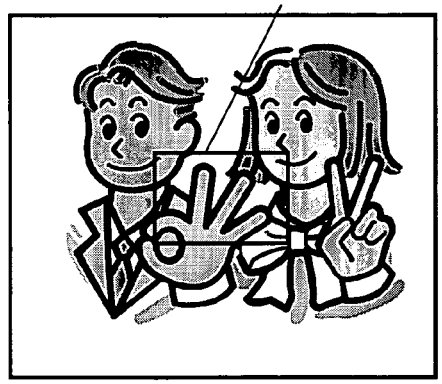
Figure 5D:
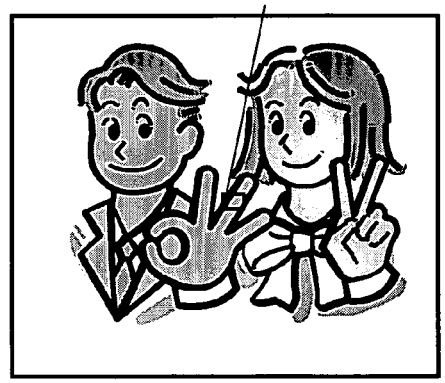
Figure 5C:
Figure 5D:
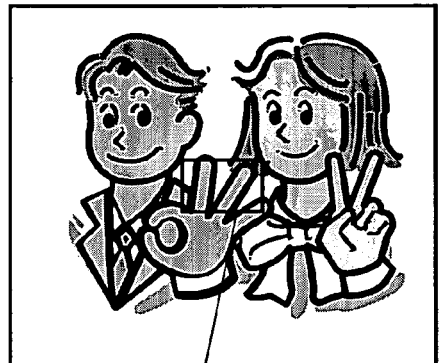
Figure 5F:
Figure 5D:
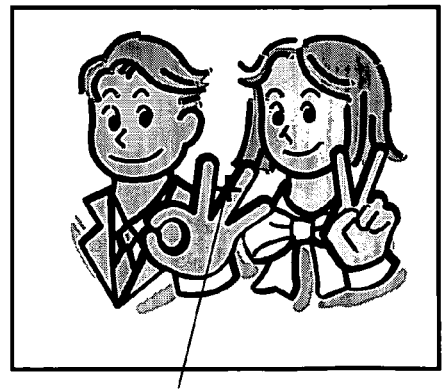

FIG. 4 describes the auto focus operations in the normal mode. In the normal mode, the 5 sample steps to cover the focal distance in the area of infinitely-far to 30 cm are pre-set. When the auto focus function is requested, signal processing unit 16 operates the lens in sequence to each sample step at each one-frame rate (e.g. 100 m/s) which is a unit of processing, takes in the graphic contrast data on the spot, decides the contrast at the fifth and final frame rate, and drives the lens to the sample step position with the maximum peak (the focal position). This is how focus is achieved. In this case, it takes half a second (5×100 ms=500 ms) from the start of the auto focus operation until focus is achieved.

Thus, the focal mark shown on display unit 20 keeps changing second by second, in response to the operation of a lens in the middle of auto focusing, as focus is achieved simply by operating a lens according to the number of samples per frame rate and finally it displays the specific focal mark indicating that achievement of focus has been attained.

FIGS. 5A-5F describe the changes of the focal mark in the form of execution in this invention. FIGS. 5A-5F correspond to time A to F in FIG. 4, respectively. The focal mark 30 in the midst of auto focusing is displayed as a rectangular frame and its size gets smaller with elapsed time (every time a lens moves to a sample step position), as shown in FIGS. 5A-5F and is displayed as a cross (FIG. 5F) which informs the users of completion of focusing once focusing is attained.

As stated above, in the event that a lens operates per frame rate on the normal mode the display of the focal mark changes per one-frame rate. If a subject is placed in a dark area where there is not enough light for sensor 12 to obtain contrast data in an exposure at the one-frame rate, a lens operates in the frame rate interval in correspondence with the time necessary to obtain a sufficient amount of light, and also the focal mark changes in that particular frame rate interval. For example, the focal mark 30 keeps changing for each two-frame rate if an exposure at one sample step and AF processing (accumulation of contrast data at each sample step and decision of contrast at the final sample step) requires time covering the two-frame rate. The amount of time necessary from the start of the auto focus operation until focus is achieved in this example is one second (5×2×100 ms=1 s). That translates into slower changes of the focal mark.

In the macro mode, as stated earlier, the number of sample steps is greater than in the normal mode. If there are 10 sample steps, a lens needs to be operated ten times in order to achieve focus. In the event that a lens operates every one-frame rate, it takes one second (10×100 ms=1 s) from the start of the auto focus operation until focus is achieved. Also, in this case, the display of the focal mark changes 10 times in response to a lens operation. As in the example shown in FIGS. 5A-5F, the size of the focal mark frame gets smaller in the middle of auto focusing and it turns into a cross sign once focus is achieved. If the size of the focal mark at the default setting is the same for both normal mode and macro mode, the rate of decrease in the size of the focal mark on the macro mode needs to be slower considering the fact that the focal mark changes twice as often in the macro mode as it does in the normal mode in the above example.

In control unit 18, for example, the data of a group of 10 focal marks, consisting of rectangular focal marks and cross-shaped signs, with sizes that gradually become minimized, are stored in advance. In the macro mode, 10 rectangular signs are shown in sequence starting with the largest one and the cross-shaped focal mark is shown once focus is achieved. In the normal mode, every other rectangular sign is shown, starting with the largest one, since the number of changes is half as many as is the case with the macro mode. The cross-shaped focal mark is shown once focus is achieved. By having a group of focal marks for macro mode, it is ready to be applied to the normal mode as well. Of course, it is also possible to have a group of focal marks exclusively for the normal mode.

In the normal mode, in which a lens operates every two-frame rate, the focal mark could change 5 times every two-frame rate with which a lens operates or it could change 10 times every one-frame rate. Either way, the velocity of change in size of the focal mark is the same.

If there is not enough light for sensor 12 to obtain the contrast data in an exposure within one-frame rate because of a subject placed in a dark area when operating in the macro mode, a lens needs to operate in the interval in correspondence with the time necessary to obtain enough light, as was the case in the abovementioned normal mode, and the focal mark also changes in that frame rate interval. If time covering the two-frame rate is required for the exposure at one sample step and AF processing, focal mark 30 keeps changing every two-frame rates. The amount of time from the start of the auto focus operation until focus is achieved in this case is 2 seconds (10×2×100 ms=2 s). Therefore, the velocity of change in the focal mark is slower.

Thus, the size of and velocity of changes in the focal mark give the users a good idea of how much longer it will take for focus to be achieved by changing the focal mark according to the status of the auto focus operations. Also, they provide users with the assurance that auto focusing is under way.

In the form of execution described in the above example, the descriptions of how the shape of focal mark can change were given. However, changes in the focal mark are not limited to shape. For example, the color or display position can also be changed. In the case where the display position changes, the distance between the position at the start of auto focusing to that at completion is always constant, and the users can tell how much longer it takes for focus to be achieved by the display position of the focal mark, as well as the velocity of changes. In the case where the color of the mark changes, the change pattern of the focal mark color is always constant from the start of auto focus operations to the completion of focusing. That way, if the velocity of color changes in the focal marks changes, the users can tell how much longer it will take for focus to be achieved, by the color and rate of change in color.

Also, the shape of the focal mark is not limited to the rectangular frame displayed in the form of execution in the above example. It could be any kind of shape as long as the users can recognize the development in the status of auto focusing. For example, a focal mark in a circle can work if it gets smaller as the auto focusing operation progresses.

Figure 6:
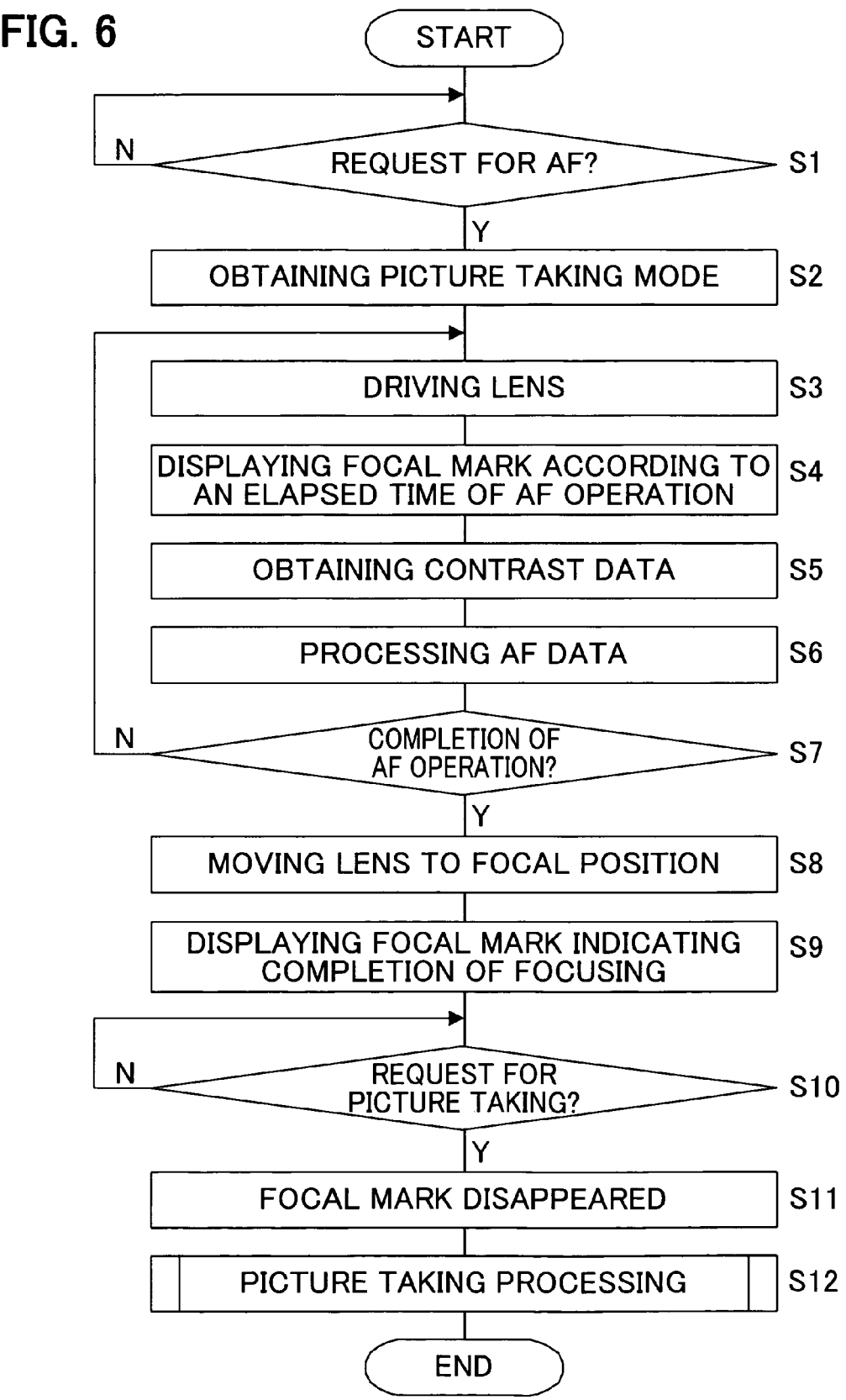
FIG. 6 is a flow chart showing auto focusing operation in progress in the form of execution of this invention.

FIG. 6 shows a process flow chart in the form of execution of this invention. This process is the one operated in control unit 18, which controls signal processing unit 16, auto focus driving unit 14 and display unit 20 according to this process flow. In step S1, when there is a request for auto focusing (AF) operation, typically by pressing the shutter halfway down, picture-taking mode (normal mode or macro mode) is prepared (S2). In this form of execution, picture-taking mode needs to be prepared, and this is exemplified by the case in which, because of picture taking mode, the number of lens operations in the middle of auto focusing is different in each case. If there is no picture taking mode, this process is not necessary.

In the next step, a lens is operated (S3) at the position of the first sample step corresponding to the pre-set picture-taking mode. In step S4, the first focal mark is indicated (for example, the focal mark in FIG. 5A). In addition, the graphic contrast data obtained (S5) by sensor 12 is stored after being processed as auto focus data in step S6. In step S7, the processes in step S3 to step S6 are repeated if a lens is not driven at each one of sample steps. In other words, a lens is driven at the next sample step, the focal mark changes in sequence, and the graphic contrast data at a particular sample step are obtained and stored.

Once the contrast data at all of sample steps is obtained, and furthermore, as the auto focusing data process in step S6, the graphic contrast of the image is decided for the lens focus position to be determined where the lens is moved (S8). When a lens is driven to the focal position, the focal mark to indicate completion of focusing is displayed (S9). When there is a request for picture taking (S10), by means of the shutter being pressed all the way down, the focal mark disappears (S11) and the picture taking processing is conducted (S12).

In the above form of execution, the process in which the focal mark in the middle of auto focusing changes corresponding to a lens operation in the middle of auto focusing is described. There is another way of processing. First, the time necessary for focusing is calculated (an example of this calculation was shown earlier) based on exposure time (the time necessary to obtain enough light for the purposes of contrast data acquisition), which is obtained through information about the graphic brightness and the number of sample steps to be obtained through picture taking mode. The calculated time is divided by certain number (e.g. 5 times or 10 times in earlier examples) to yield the number of changes of the focal mark in this process. In step 2 of FIG. 6, information about the graphic brightness in addition to the picture-taking mode is obtained. The calculation to determine time necessary to achieve focus varies, depending on the type of auto focus function. The appropriate calculation for each function needs to be performed.

In the above form of execution, an auto focus operation is described, in which a lens operates at the position of sample steps, of which the number is pre-determined. This form of execution can also be applied to other types of auto focus operations. For example, in the case where contrast is decided based on the contrast data stored at each sample step, the focal position can sometimes be determined prior to acquisition of contrast data at all of the sample steps, by recognizing the end of the peak. Thus, if the remaining time to achieve focus changes in response to the progress of the auto focus operations, the changes in the focal mark can be updated by changing the velocity of changes in the focal mark, in response to the changes in the remaining time to achieve focus, without having to keep changing the focal mark all the time, and by leaving out some of the in-between focal marks, when the focal position is determined to change the shape of the current focal mark to the one prior to the completion of focus.

In the case where auto focusing is performed by measuring distances using electromagnetic waves such as infrared, the focal mark should be designed to change in sequence for the entire time during the pre-set amount of time, as time from the start of the auto focus operation until focus is achieved is considered to be constant.

What is claimed is:

1. An image pickup device having an auto focus function, comprising:
   a display configured to display pictures taken in from a lens; and
   a control unit configured to control a display of a focal mark showing the focal condition on said display unit and a remaining time until an auto focus operation is achieved on said display,
   wherein the control unit drives the lens in sequence to a plurality of sample positions, determines the focal position from the plurality of sample position, and estimates the remaining time based on a distance between the focal position and a current position.

2. A method for notifying about the focusing time in an auto focus operation, comprising the steps of:
   displaying a focal mark showing the focal state and a remaining time until the auto focus operation is achieved, when displaying images taken in from a lens; and
   controlling a display of a focal mark according to changes in the remaining time,
   wherein the controlling step includes driving the lens in sequence to a plurality of sample positions, determining the focal position from the plurality of sample position, and estimating the remaining time based on a distance between the focal position and a current position.

3. An image pickup device, comprising:
   a display means for displaying pictures taken in from a lens; and
   a control means for controlling a display of a focal mark showing the focal condition and a remaining time until an auto focus operation is achieved on said display means,
   wherein the control means is configured to drive the lens in sequence to a plurality of sample positions, to determine the focal position from the plurality of sample position, and to estimate the remaining time based on a distance between the focal position and a current position.

* * * * *